No. 791,837. PATENTED JUNE 6, 1905.
C. E. SWEET.
ELASTIC FLUID TURBINE.
APPLICATION FILED APR. 20, 1905.
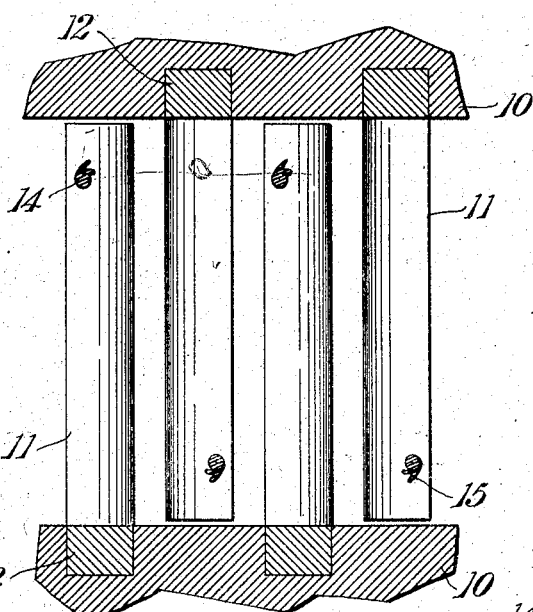
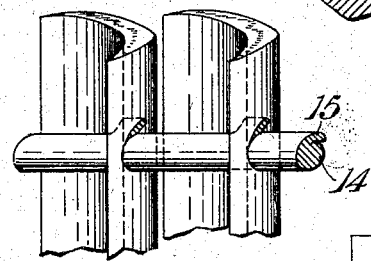
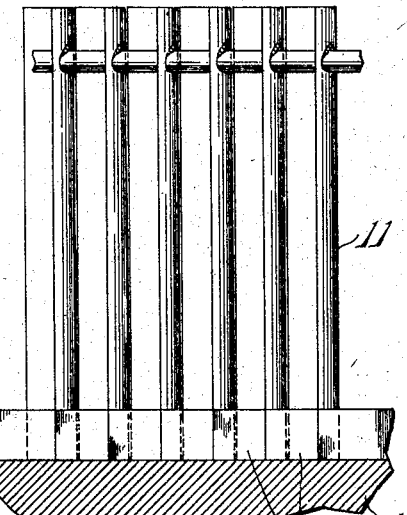
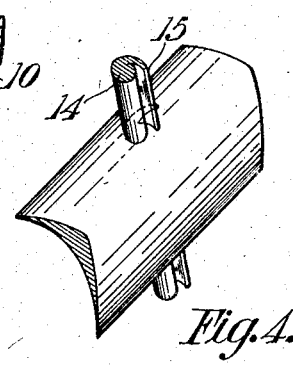
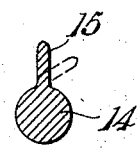
WITNESSES:
G. L. Ryder
E. W. McCallister
INVENTOR
Charles E. Sweet
BY
Jno. T. Green
ATTORNEY No. 791,837.

Patented June 6, 1905.

UNITED STATES PATENT OFFICE.

CHARLES E. SWEET, OF PITTSBURG, PENNSYLVANIA, ASSIGNOR TO THE WESTINGHOUSE MACHINE COMPANY, A CORPORATION OF PENNSYLVANIA.

ELASTIC-FLUID TURBINE.

SPECIFICATION forming part of Letters Patent No. 791,837, dated June 6, 1905.

Application filed April 20, 1905. Serial No. 256,550.

*To all whom it may concern:*

Be it known that I, CHARLES E. SWEET, a citizen of the United States, and a resident of Pittsburg, in the county of Allegheny and State of Pennsylvania, have invented a new and useful Improvement in Elastic-Fluid Turbines, of which the following is a specification.

This invention relates to elastic-fluid turbines, and more particularly to locking and spacing means for the outer ends of the blades and vanes thereof.

It is now common in elastic-fluid turbines in which the blades or vanes thereof are arranged in annularly-extending rows to secure the outer ends of the blades or vanes comprised in one such row together, and, as shown by Letters Patent No. 639,608, of December 19, 1899, attempts have been made to this end by soldering or brazing the blades comprised in a row to a binder strip or wire passing through openings therefor in said blades or vanes. The brazing or soldering method described in this patent is not satisfactory. Soldering is objectionable, as it is found that when using superheated steam the same melts and runs, and brazing is objectionable, because the heat necessary has a tendency to destroy the blade.

I am aware that other attempts have been made to attain the end sought by riveting a strip to the outer ends of the blades or vanes; but this is a costly means from a manufacturing standpoint and necessitates longer blades than without the strip to obtain the same effective blade or vane areas.

The object of this invention is to produce blade or vane locking and spacing means and a method of forming the same which overcomes all of the objections to the means heretofore utilized with which I am familiar; and my invention consists in the method hereinafter described and the means illustrated in the drawings accompanying this application and forming a part thereof.

In the drawings, Figure 1 is a view in side elevation of a plurality of turbine blades or vanes comprised in an annular row, and the outer or free ends of the blades and vanes are shown spaced apart and locked together. Fig. 2 is an end view in elevation of a plurality of vanes and blades comprised in four annular rows. Fig. 3 is a view in perspective of two blades or vanes with this invention applied thereto. Fig. 4 is a view in perspective of one blade or vane shown with the locking and spacing strip extending therethrough. Figs. 5, 6, 7, 8, and 9 are cross-sectional views of modified forms of locking and spacing strips which may be utilized, if desired, and which embody certain principles of this invention.

As this invention may be utilized in various types of turbines and also in various types of compressors and pumps and is applicable either to the rotor-blades or stator-vanes therefor, the blades or vanes may be of any desired contour in cross-section, of any desired length, or formed of any desired material in any desired manner.

The blades or vanes may be secured to the rotors or stators in any desired manner, but are preferably secured to their holding members—that is, either the rotors or stators—as illustrated and described in said Letters Patent No. 639,608. As illustrated in the drawings, the rotor or stator member, which may be represented by 10, is provided with an annular or circumferentially-extending slot or channel, within which the inner ends of the blades or vanes 11 are secured by means of calking and spacing elements or pieces 12, as is now common. For the sake of clearly describing this method it will be understood that the side walls of these channels or slots are roughened or undercut and that by means of suitable calking-irons or other tools the spacing-pieces or the blocks 12 are caused to spread transversely to the applied pressure to grip the walls of the channels and the vanes or blades, whereby said vanes or blades are securely held to the stator or rotor, as the case may be. Each blade adjacent to its outer end is provided with a hole or opening conforming to a cross-section of the locking and spacing strip to be used and through which the locking and spacing strip is inserted. These holes or openings are preferably punched in the blades or vanes before they are assembled in their holding slots or channels, and after a few of the blades or vanes have been calked into the slot or channel the holding-strip will be threaded therethrough and the remaining blades or vanes strung onto the holding-strip and then inserted into the slot or channel, alternating with the calking-pieces heretofore described. It has been found preferable to arrange the blades or vanes in groups by means of the locking and spacing strip and to secure the several groups together by some convenient means which will prevent the several groups from moving out of the row-plane. In other words, the locking and spacing strips are cut into suitable lengths—say to cover twenty or thirty blades—in order to take care of the expansions and contractions which occur on account of the heat changes within the turbine. After the blades or vanes have been calked into place and the locking and spacing strips inserted the strip is partially cut or sheared through a portion of its section in close proximity to the complementary faces of the adjacent blades, and the part so sheared is bent over or turned out of alinement with the holes through the blades or vanes, whereby spacing-pieces are formed which are integral with the locking-strip and the end edges of which contact with the complementary faces of the adjacent blades or vanes. As shown in the several views of the drawings, this strip may be of various contours in cross-section; but it has been found desirable to have a body portion to the same, as shown in Figs. 6, 7, and 8 at 14, and one or more protruding fins, beads, or ribs 15. An easy method of shearing and turning over this spacing portion has been found, which consists in driving a tool down along the blade or vane edges or faces and using the blade as a portion of the shears to shear the spacing portion and at the same time bend it over to the desired position.

From the number of modifications shown it is apparent that the invention is broad in its character and not limited to the use of a locking-strip of any particular cross-section, and,

Having thus described my invention, what I claim as new and useful, and desire to secure by Letters Patent, is—

1. In combination with a plurality of blades or vanes comprised in an annular row, spacers lying between the blades or vanes and held in place by a locking-strip which passes through holes formed in the blades or vanes.

2. In combination with a plurality of blades or vanes comprised in an annular row, spacers lying between the blades or vanes and formed integral with a locking-strip which passes through holes formed in the blades or vanes.

3. In combination with a plurality of blades or vanes comprised in an annular row, a spacing and locking strip or member passing through holes formed for its reception in the blades or vanes and provided with projections which contact with the complementary faces of adjacent blades or vanes.

4. In combination with a plurality of blades or vanes comprised in an annular row, spacers formed integral with a strip extending through said blades or vanes and each of which spacers has its opposite end faces in contact with the complementary faces of the adjacent blades or vanes.

5. In combination with a plurality of blades or vanes comprised in an annular row, a locking and spacing strip which lies within holes in the blades or vanes, and which between adjacent blades or vanes has a portion of itself cut or otherwise severed and moved to an unusual position.

6. In combination with a plurality of blades or vanes comprised in an annular row, a locking-strip passing through said blades or vanes and which is partially cut or sheared laterally and bent or turned over between adjacent blades or vanes to form spacing projections, the end edges of which contact with the complementary faces of said blades or vanes.

7. In combination with a plurality of blades or vanes comprised in an annular row, a locking and spacing strip extending through holes formed in said blades or vanes and which is laterally cut or sheared through a portion of its section adjacent to the complementary faces of the blades or vanes and turned out of alinement with said holes.

8. In combination with a plurality of blades or vanes comprised in an annular row, a spacing-piece extending through holes formed in said blades or vanes and which between adjacent blades or vanes is bent to an unusual angle relative to the body portion of the strip and which has its ends sheared from the strip and in contact with the complementary blade or vane faces which it lies between.

9. In combination with a plurality of blades or vanes comprised in an annular row, a ribbed or finned locking and spacing strip which lies within holes in the blades or vanes and which between adjacent blades or vanes has its rib or fin cut and turned out of alinement with the holes in the blades or vanes.

In testimony whereof I have hereunto subscribed my name this 19th day of April, 1905.

CHAS. E. SWEET.

Witnesses:
 DAVID WILLIAMS,
 JNO. S. GREEN.